US006530521B1

(12) United States Patent
Henry

(10) Patent No.: US 6,530,521 B1
(45) Date of Patent: Mar. 11, 2003

(54) PRODUCE RECOGNITION APPARATUS AND METHOD OF OBTAINING INFORMATION ABOUT PRODUCE ITEMS

(75) Inventor: Scott Ballard Henry, Loganville, GA (US)

(73) Assignee: NCR Corporation, Dayton, OH (US)

( * ) Notice: Subject to any disclaimer, the term of this patent is extended or adjusted under 35 U.S.C. 154(b) by 118 days.

(21) Appl. No.: 09/617,654

(22) Filed: Jul. 17, 2000

(51) Int. Cl.[7] .............................................. G06K 15/00
(52) U.S. Cl. ....................................... 235/383; 235/454
(58) Field of Search .................................. 235/383, 454

(56) References Cited

U.S. PATENT DOCUMENTS

| | | | |
|---|---|---|---|
| 4,693,330 | A | 9/1987 | Uchimura et al. |
| 4,703,423 | A | 10/1987 | Bado |
| 5,166,755 | A | 11/1992 | Gat |
| 5,250,789 | A | 10/1993 | Johnsen |
| 5,295,064 | A | 3/1994 | Malec et al. |
| 5,305,197 | A | 4/1994 | Axler et al. |
| RE34,915 | E | 4/1995 | Nichtberger et al. |
| 5,546,475 | A | 8/1996 | Bolle et al. |
| 5,578,797 | A | 11/1996 | Hewitt et al. |
| 5,664,110 | A | 9/1997 | Green et al. |
| 5,704,350 | A | 1/1998 | Williams |
| 5,821,512 | A | 10/1998 | O'Hagan et al. |
| 5,821,513 | A | 10/1998 | O'Hagan et al. |
| 5,832,446 | A | 11/1998 | Neuhaus |
| 5,859,414 | A | 1/1999 | Grimes et al. |
| 5,867,265 | A | 2/1999 | Thomas |
| 5,896,294 | A | 4/1999 | Chow |
| 5,913,210 | A | 6/1999 | Call |
| 5,918,211 | A | 6/1999 | Sloane |
| 5,950,173 | A | 9/1999 | Perkowski |
| 5,970,469 | A | 10/1999 | Scroggie et al. |
| 5,979,757 | A | 11/1999 | Tracy et al. |
| 5,983,200 | A | 11/1999 | Slotznick |

*Primary Examiner*—Harold I. Pitts
(74) *Attorney, Agent, or Firm*—Paul W. Martin; Priest & Goldstein PLLC

(57) ABSTRACT

A produce recognition apparatus which provides a convenient way for a customer to obtain information about a produce item without first having to know what the produce item is. The produce recognition apparatus includes a station, a produce data collector with the station, a display on the station, an input device with the station, and a computer with the station which obtains produce data from the produce data collector, determines identification information associated with the produce item from the produce data, displays the identification information and navigation information for obtaining additional information about the produce item on the display, records a customer selection for the additional information through the input device, retrieves the additional information, and displays the additional information on the display.

21 Claims, 4 Drawing Sheets

PRODUCE RECOGNITION APPARATUS AND METHOD OF OBTAINING INFORMATION ABOUT PRODUCE ITEMS

CROSS-REFERENCE TO RELATED APPLICATIONS

The present invention is related to the following commonly assigned and co-pending U.S. application:

"A Produce Data Collector And A Produce Recognition System", filed Nov. 10, 1998, invented by Gu, and having a Ser. No. 09/189,783.

BACKGROUND OF THE INVENTION

The present invention relates to product checkout devices and more specifically to a produce recognition apparatus and a method of obtaining information about produce items.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items, or a lookup of text in table. Operator identification methods are also prone to error, on the order of fifteen percent.

A produce recognition system is disclosed in the cited co-pending application. A produce item is placed over a window in a produce data collector, the produce item is illuminated, and the spectrum of the diffuse reflected light from the produce item is measured. A terminal compares the spectrum to reference spectra in a library. The terminal determines candidate produce items and corresponding confidence levels and chooses the candidate with the highest confidence level. The terminal may additionally display the candidates for operator verification and selection.

Obtaining recipe, nutritional, and other information for produce items is a tedious task, whether it be by selecting pull cards from a rack or by searching in cook books or other books. Therefore, it would be desirable to provide a produce recognition apparatus and a method of obtaining information about produce items.

SUMMARY OF THE INVENTION

In accordance with the teachings of the present invention, a produce recognition apparatus and a method of obtaining information about produce items are provided.

The produce recognition apparatus includes a station, a produce data collector with the station, a display on the station, an input device with the station, and a computer with the station which obtains produce data from the produce data collector, determines identification information associated with the produce item from the produce data, displays the identification information and navigation information for obtaining additional information about the produce item on the display, records a customer selection for the additional information through the input device, retrieves the additional information, and displays the additional information on the display.

The method includes the steps of obtaining produce identification information associated with the produce item using a produce data collector, displaying the produce identification information, recording a customer selection for additional information about the produce item, retrieving selected additional information, and displaying the selected additional information.

It is accordingly an object of the present invention to provide a produce recognition apparatus and a method of obtaining information about produce items, such as recipes.

It is another object of the present invention to make information about produce items, such as recipes, more readily available to customers.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
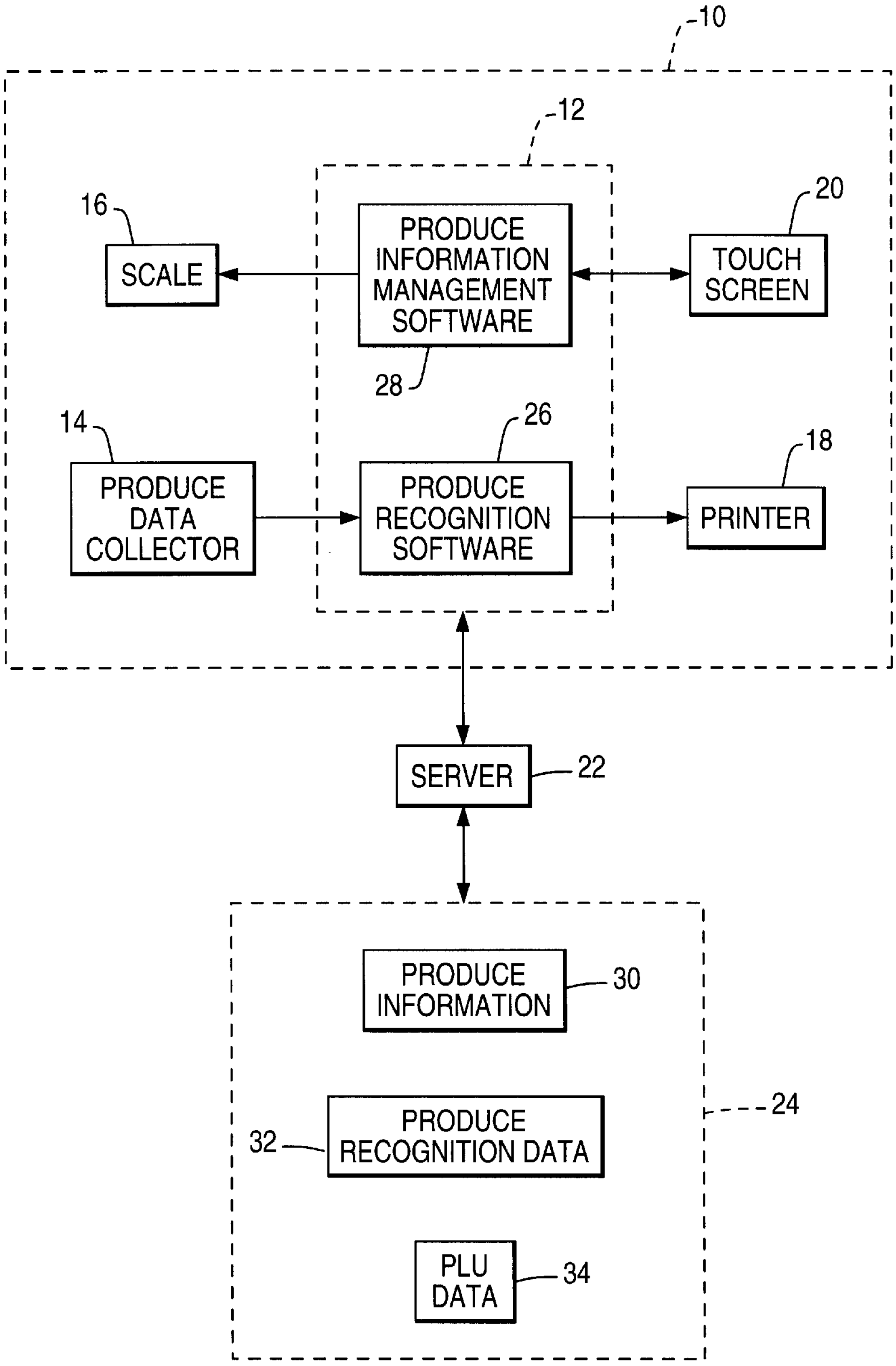
FIG. 1 is a block diagram of a transaction processing system.

Referring now to FIG. 1, produce recognition apparatus 10 includes produce data collector 12, printer 14, touch screen 16, and computer 18. Produce recognition apparatus 10 may additionally include scale 20.

Produce data collector 12 collects information about a produce item. Such data may include color and color distribution data, size data, shape data, surface texture data, and aromatic data.

Printer 14 prints print recipes and other produce information requested by customers.

Touch screen 16 displays information and records customer choices and selections. Although a touch screen has been disclosed, separate display and input devices are also envisioned.

Computer 18 controls operation of apparatus 10. Computer 18 executes produce recognition software 26 and produce information management software 28.

Produce recognition software 26 obtains characteristics of a produce item from produce data collector 12, and identifies the produce item by comparing collected produce data with a library of produce recognition data 32. Produce recognition software 26 may additionally retrieve an item identification number from produce recognition data 32 and pass it produce information management software 28 for price checks.

Produce information management software 28 manages customer queries for information. Produce information management software 28 also controls printer 14, touch screen 16, and scale 20.

One query may be a price check. Produce information management software 28 obtains a price, or a unit price for items sold by weight, from PLU data 34. If apparatus 10 includes scale 20, produce information management software 28 can return a total price for items sold by weight.

In addition to price checks, produce information management software 28 provides information such as recipe information, nutritional information, produce origin information, produce growing conditions, and other helpful information about produce items.

Server 22 links apparatus 10 and others like it with produce information 30, produce recognition data 32, and PLU data 34 through a standard network connection. Server 22 may also link apparatus 10 with other networked computers outside the store, such as web sites.

Server 22 may also handle identification of produce items. Under this embodiment, each apparatus 10 would forward collected produce data from produce data collectors 12 to server 22 for recognition.

Storage medium 24 stores produce information 30, produce recognition data 32, and PLU data 34. Any of this information or data may also be stored locally at apparatus 10.

Figure 2:
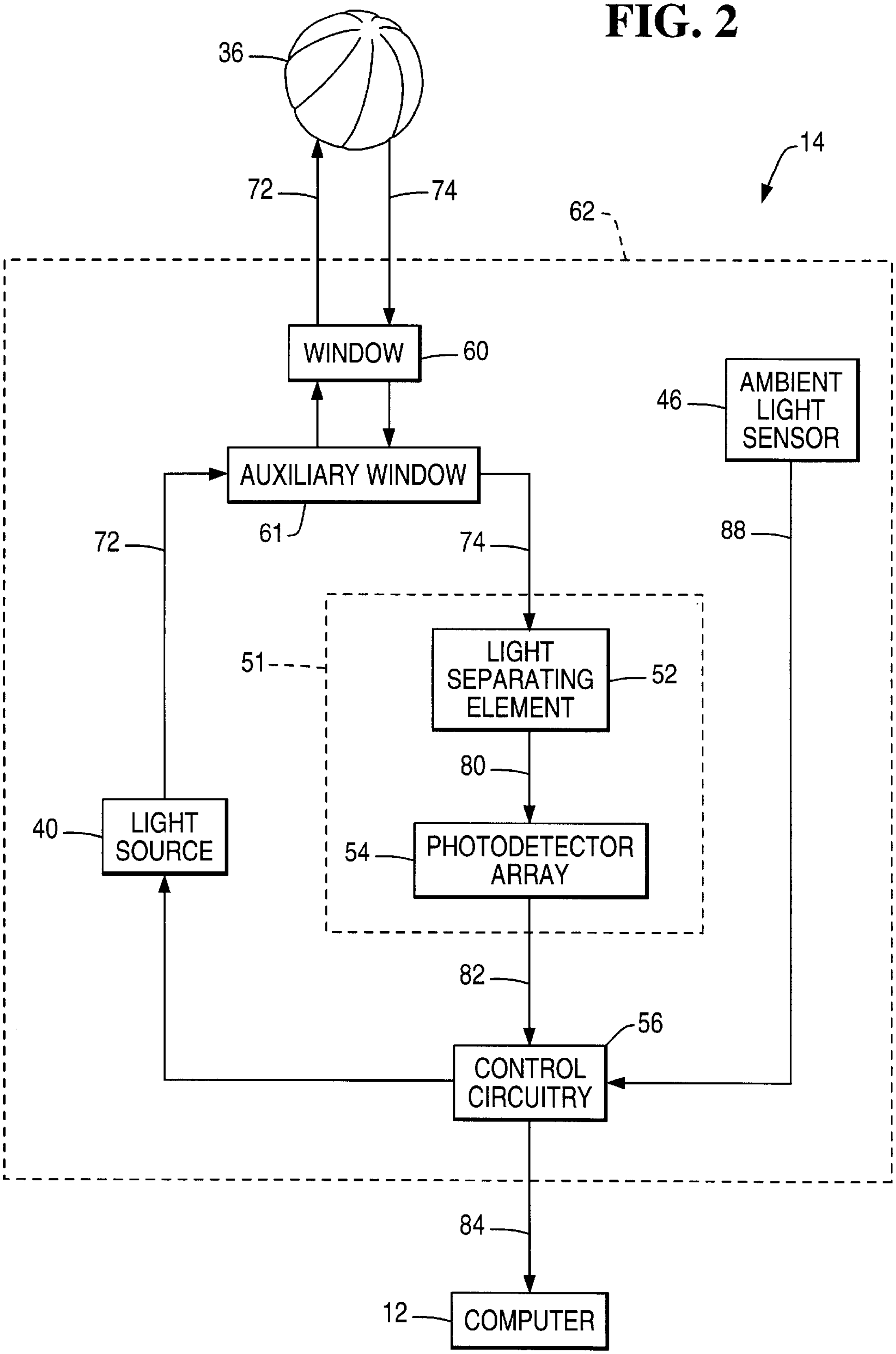
FIG. 2 is a block diagram of a produce recognition apparatus.

Turning now to FIG. 2, an example produce data collector 12 is illustrated and primarily includes light source 40, ambient light sensor 46, spectrometer 51, control circuitry 56, transparent window 60, auxiliary transparent window 61, and housing 62.

Light source 40 produces light 70. Light source 40 preferably produces a white light spectral distribution, and preferably has a wavelength range from 400 nm to 700 nm, which corresponds to the visible wavelength region of light.

Light source 40 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity. The LEDs can be turned on and off very quickly, since it only takes less than two milliseconds for the LEDs to reach their stable output.

Ambient light sensor 46 senses the level of ambient light through windows 60 and 61 and sends ambient light level signals 88 to control circuitry 56. Ambient light sensor 46 is mounted anywhere within a direct view of window 61.

Spectrometer 51 includes light separating element 52 and detector 54.

Light separating element 52 splits light 76 in the preferred embodiment into light 80 of a continuous band of wavelengths. Light separating element 52 is preferably a linear variable filter (LVF), such as the one manufactured by Optical Coating Laboratory, Inc., or may be any other functionally equivalent component.

Detector 54 produces waveform signals 82 containing spectral data. The pixels of the array spatially sample the continuous band of wavelengths produced by light separating element 52, and produce a set of discrete signal levels. Detector 54 is preferably a photodetector array, including a complimentary metal oxide semiconductor (CMOS) array, but could be a Charge Coupled Device (CCD) array. The typical integration time of detector 54 is anywhere between five and a few hundred milliseconds depending on the internal illumination level and the detector sensitivity, but is typically about fifty milliseconds.

Control circuitry 56 controls operation of produce data collector 12 and produces digitized produce data waveform signals 84. For this purpose, control circuitry 56 includes a processor, memory, and an analog-to-digital (A/D) converter. A twelve bit A/D converter with a sampling rate of 22–44 kHz produces acceptable results.

Control circuitry 56 also receives signals from ambient light sensor 46. In response to ambient light level signals 88, control circuitry 56 waits for ambient light levels to fall to a minimum level before turning on light source 40. Ambient light levels fall to a minimum level when produce item 36 covers window 60. After control circuitry 56 has received waveform signals 82 containing produce data, control circuitry 56 turns off light source 40 and waits for ambient light levels to increase. Ambient light levels increase after produce item 36 is removed from window 60.

Housing 62 contains light source 40, ambient light sensor 46, spectrometer 51, control circuitry 56, and auxiliary transparent window 61. Housing 62 additionally contains transparent window 60 when produce data collector 12 is a self-contained unit. When produce data collector 12. is mounted within the housing of scale 20, window 60 may be located in a scale weigh plate instead.

Housing 62 is approximately five and a half inches in length by two and three quarters inches in width by one and three quarters inches in height.

Transparent window 60 is mounted above auxiliary transparent window 61. Windows 60 and 61 include an anti-reflective surface coating to prevent light 72 reflected from windows 60 and 61 from contaminating reflected light 74.

In operation, light source 40 is turned off during the wait or idle state. An operator places produce item 36 on window 60. Control circuitry 56 senses placement and turns controls light source 40 so as to illuminate produce item 36 and measure ambient light leakage. Control circuitry 56 starts integration by photodetector 54. Light separating element 52 separates reflected light 74 into different wavelengths to produce light 80 of a continuous band of wavelengths. Detector 54 produces waveform signals 82 containing produce data. Control circuitry 56 produces digitized produce data signals 84 which it sends to computer 18 for identification by produce recognition software 26. Control circuitry 56 turns off light source 40 and waits for the next produce item.

Computer 18 uses produce data in digitized produce data signals 84 to identify produce item 36. After identification, computer 18 displays the identification information and obtains whatever information the user may ask for through produce information management software 28. For example, computer 18 may provide a unit price from PLU data 34 and a weight from scale 20.

Figure 3:
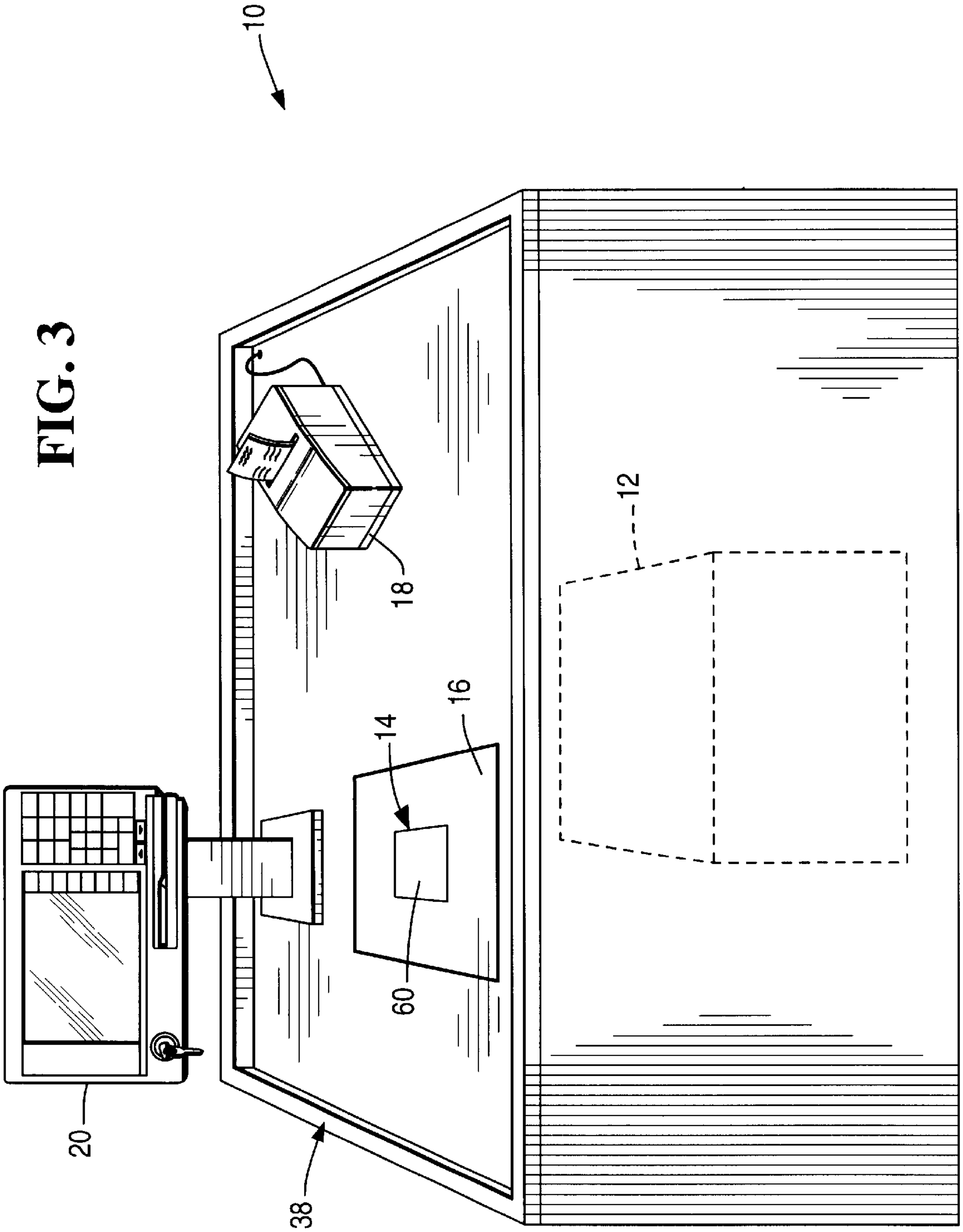
FIG. 3 is a perspective view of the produce recognition apparatus.

Turning now to FIG. 3, an example of apparatus 10 includes station 38. Station 38 may include a counter with a work surface. Station contains computer 12. Touch screen 20 is a Dynakey® terminal produced by the assignee of the present invention. Separate display and input devices may also be employed. Produce data collector 14, scale 16, and printer 18 are all accessible to customers at station 38.

An upright kiosk without a work surface, such as one manufactured by the assignee of the present invention, may also be adapted to include produce data collector 14 and optionally scale 16. Other types of kiosks are also suitable for use with the present invention.

Figure 4:
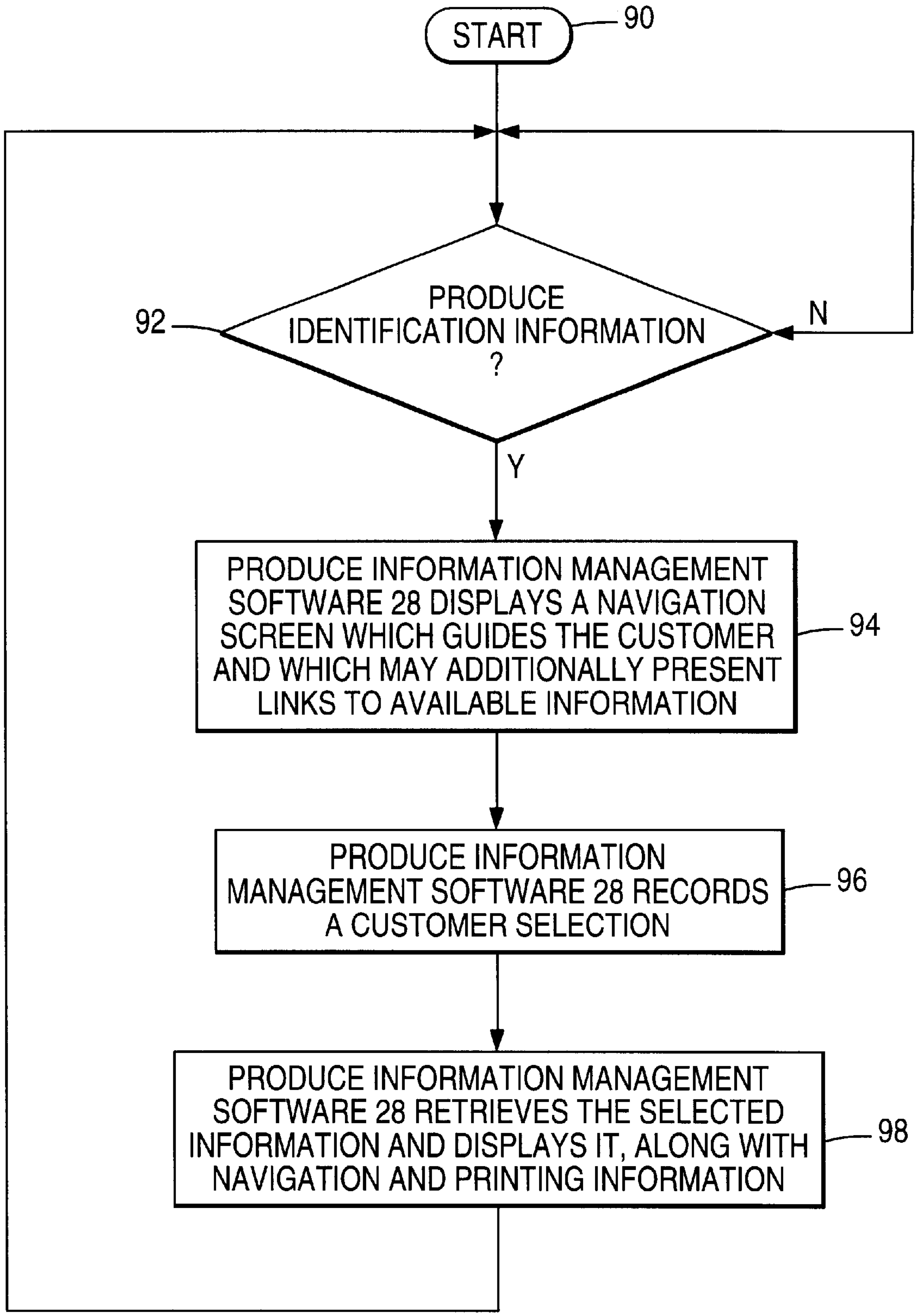
FIG. 4 is a flow diagram illustrating the method of obtaining information about produce items.

Turning now to FIG. 4, a method of obtaining information about produce items is illustrated beginning with START 90.

In step 92, produce information management software 28 waits for produce identification information from produce recognition software 26. During this time, produce information management software 28 may display a default screen containing instructions or promotions or both.

A customer places produce item 36 over window 60 and produce recognition software 26 collects produce data. Produce recognition software 26 identifies produce item 36 and passes the identification information to produce information management software 28. Produce information management software 28 receives the produce identification information from produce recognition software 26.

Identification information may include a candidate list of possible identities ranked in order of confidence level. If so, produce information management software 28 may request that the customer verify or select a correct identity from the list.

In step 94, produce information management software 28 displays a navigation screen which guides the customer and which may additionally present links to available information.

In step 96, produce information management software 28 records a customer selection.

In step 98, produce information management software 28 retrieves the selected information and displays it, along with navigation and printing information. If the customer wishes to print the selected information, produce information management software 28 causes printer 14 to print it.

Selected information may include recipe information, nutritional information, and other helpful information about produce items.

If the customer is finished, produce information management software 28 returns to the default screen after a predetermined timeout period.

Advantageously, apparatus 10 provides a convenient way for a customer to obtain information about a produce item without first having to know what the produce item is. Also, the customer can obtain the information without assistance from a store employee.

Although the invention has been described with particular reference to certain preferred embodiments thereof, variations and modifications of the present invention can be effected within the spirit and scope of the following claims.

I claim:

1. A method of obtaining information about a produce item comprising the steps of:

obtaining produce identification information from the characteristics of the produce item using a produce data collector;

displaying the produce identification information;

recording a customer selection for additional helpful information about the produce item;

retrieving selected additional helpful information; and displaying the selected additional helpful information.

2. The method as recited in claim 1, further comprising the step of:

printing the selected additional helpful information.

3. The method as recited in claim 1, wherein the step of obtaining comprises the substeps of:

obtaining produce data associated with the produce item from a produce data collector;

determining a list of candidate identifications for the produce item from the produce data;

displaying the list of candidate identifications; and recording customer selection for a correct identity from the list.

4. The method as recited in claim 1, wherein the step of recording comprises the substep of:

recording a customer selection for additional helpful information about the produce item, including recipe information.

5. The method as recited in claim 1, wherein the step of recording comprises the substep of:

recording a customer selection for additional helpful information about the produce item, including nutritional information.

6. The method as recited in claim 1, further comprising the step of:

obtaining weight information associated with the produce item using a scale.

7. The method as recited in claim 6, wherein the step of recording comprises the substep of:

recording a customer selection for additional information about the produce item, including price information.

8. The method as recited in claim 1, wherein the step of retrieving comprises the substep of:

retrieving the selected additional helpful information from a network-accessible data source.

9. A method of obtaining information about a produce item comprising the steps of:

obtaining produce identification information associated with the produce item using a produce data collector;

displaying the produce identification information; and displaying recipe information associated with the produce item.

10. A method of obtaining information about a produce item comprising the steps of:

obtaining produce identification information associated with the produce item using a produce data collector;

displaying the produce identification information; and displaying nutritional information associated with the produce item.

11. A method of obtaining information about a produce item comprising the steps of:

obtaining produce identification information from the characteristics of the produce item using a produce data collector;

obtaining weight information associated with the produce item using a scale;

displaying the produce identification information;

retrieving unit price information;

determining total price information from the unit price information and weight information;

determining additional helpful information associated with the produce item; and displaying the total price information and the additional helpful information.

12. A produce recognition apparatus comprising:

a station;

a produce data collector with the station;

a display with the station;

an input device with the station; and a computer with the station which obtains produce data from the produce data collector, which determines identification information from the characteristics of the produce item from the produce data, which displays the identification information and navigation information for obtaining additional helpful information about the produce item on the display, which records a customer selection for the additional helpful information through the input device, which retrieves the additional helpful information, and which displays the additional helpful information on the display.

13. The produce recognition apparatus as recited in claim 12, further comprising:

a scale with the station, wherein the computer obtains weight information associated with the produce item from the scale.

14. The produce recognition apparatus as recited in claim 12, further comprising:

a printer with the station, wherein the computer causes the printer to print the additional helpful information.

15. A produce recognition apparatus comprising:

a station;

a produce data collector with the station;

a display with the station;

an input device with the station; and a computer with the station which obtains produce data from the produce data collector, which determines identification information associated with the produce item from the produce data, and which displays the identification information and recipe information associated with the produce item on the display.

16. A produce recognition apparatus comprising:

a station;

a produce data collector with the station;

a display with the station;

an input device with the station; and a computer with the station which obtains produce data from the produce data collector, which determines identification information associated with the produce item from the produce data, and which displays the identification information and nutritional information associated with the produce item on the display.

17. A produce recognition apparatus comprising:

a station;

a produce data collector with the station;

a scale with the station;

a display with the station;

an input device with the station; and a computer with the station which obtains produce data from the produce data collector, which determines identification information from the characteristics of produce item from the produce data, which obtains weight information associated with the produce item from the scale, which displays the identification information, which determines price information for the produce item using the weight information, which determines additional helpful information associated with the produce item, and which displays the price information and additional helpful information.

18. The method of claim 1, in which the additional helpful information is selected from the group consisting of recipe information, nutritional information, produce origin information, and produce growing conditions.

19. The method of claim 11, in which the additional helpful information is selected from the group consisting of recipe information, nutritional information, produce origin information, and produce growing conditions.

20. The produce recognition apparatus of claim 12, in which the additional helpful information is selected from the group consisting of recipe information, nutritional information, produce origin information, and produce growing conditions.

21. The produce recognition apparatus of claim 17, in which the additional helpful information is selected from the group consisting of recipe information, nutritional information, produce origin inflation, and produce growing conditions.

* * * * *

UNITED STATES PATENT AND TRADEMARK OFFICE

CERTIFICATE OF CORRECTION

PATENT NO. : 6,530,521 B2
DATED : March 11, 2003
INVENTOR(S) : Henry, S.

It is certified that error appears in the above-identified patent and that said Letters Patent is hereby corrected as shown below:

Column 5,
Line 53, delete "associated with" and insert -- from the characteristics of --.

Column 6,
Lines 8, 23, 30 and 37, delete "associated with" and insert -- from the characteristics of --.
Lines 20 and 21, delete "associated with" and insert -- from the characteristics of --.
Lines 27 and 28, delete "associated with" and insert -- from the characteristics of --.
Lines 43 and 44, delete "associated with" and insert -- from the characteristics of --.

Column 7,
Lines 2, 15, 26 and 29, delete "associated with" and insert -- from the characteristics of --.
Lines 17 and 18, delete "associated with" and insert -- from the characteristics of --.

Column 8,
Line 7, before "produce", first occurrence, insert -- the --.
Line 8, delete "associated with" and insert -- from the characteristics of --.
Lines 12 and 13, delete "associated with" and insert -- from the characteristics of --.
Line 31, after "origin" delete "inflation" and insert -- information --.

Signed and Sealed this

Twenty-sixth Day of August, 2003

JAMES E. ROGAN
*Director of the United States Patent and Trademark Office*